United States Patent
Keigley et al.

(10) Patent No.: US 12,538,857 B1
(45) Date of Patent: Feb. 3, 2026

(54) SELF-ALIGNING, ENGAGEMENT-BIASED HITCH APPARATUSES, METHODS, AND SYSTEMS

(71) Applicant: ABI ATTACHMENTS, INC., Mishawaka, IN (US)

(72) Inventors: Kevin V. Keigley, Osceola, IN (US); Nathaniel Lee Smith, Goshen, IN (US)

(73) Assignee: ABI ATTACHMENTS, INC., Mishawaka, IN (US)

( * ) Notice: Subject to any disclaimer, the term of this patent is extended or adjusted under 35 U.S.C. 154(b) by 661 days.

(21) Appl. No.: 17/932,010

(22) Filed: Sep. 14, 2022

(51) Int. Cl.
*A01B 59/043* (2006.01)
*A01B 59/041* (2006.01)
*A01B 61/02* (2006.01)

(52) U.S. Cl.
CPC .......... *A01B 59/043* (2013.01); *A01B 59/041* (2013.01); *A01B 61/02* (2013.01)

(58) Field of Classification Search
CPC ...... A01B 59/043; A01B 59/041; A01B 61/02
See application file for complete search history.

(56) References Cited

U.S. PATENT DOCUMENTS

| | | | | |
|---|---|---|---|---|
| 4,377,296 A | * | 3/1983 | Ulshafer, Jr. | B62D 49/02 280/416.2 |
| 5,690,182 A | * | 11/1997 | Ward | B60D 1/52 280/416.2 |
| 6,585,057 B1 | * | 7/2003 | Hainsworth | B60D 1/62 172/677 |
| 7,690,439 B2 | * | 4/2010 | Priepke | A01B 71/063 180/53.3 |
| 2002/0024195 A1 | * | 2/2002 | Heller | B60D 1/62 280/504 |
| 2010/0295005 A1 | | 11/2010 | Riggs | |
| 2017/0290258 A1 | * | 10/2017 | Mollick | A01B 63/023 |

FOREIGN PATENT DOCUMENTS

| | | |
|---|---|---|
| DE | 102006023179 | 1/2008 |
| DE | 102008032103 | 1/2010 |
| EP | 0346701 | 12/1989 |
| EP | 1522213 | 4/2005 |
| EP | 2959759 | 12/2015 |
| WO | 2017060575 | 4/2017 |

OTHER PUBLICATIONS

EP_1522213_A1_—_ English_translation (Year: 2005).*

* cited by examiner

*Primary Examiner* — Joseph M Rocca
*Assistant Examiner* — Julia C Tran
(74) *Attorney, Agent, or Firm* — ABI ATTACHMENTS, INC.

(57) ABSTRACT

An apparatus for operatively coupling a towable tool with a work machine via a three-point hitch includes a vehicle-side and a tool-side frame operatively coupled with a pivot bearing and a key-lock pairing. A biasing member is coupled with an configured to bias the tool-side frame relative to the vehicle-side frame.

20 Claims, 12 Drawing Sheets

100 # SELF-ALIGNING, ENGAGEMENT-BIASED HITCH APPARATUSES, METHODS, AND SYSTEMS

BACKGROUND

The present disclosure relates to self-aligning, engagement-biased hitch apparatuses, methods, and systems. A number of hitches have been proposed for attaching towable tools with tow vehicles. Heretofore, such hitches have suffered from a number of drawbacks and disadvantages. For example, various proposals have been made for positioning of tools coupled with hitches, but such proposals have required power-consuming accessories and imposed parasitic costs on the efficacy and functionality of proposed hitches and tools coupled with the same. There remains a substantial need for the unique apparatuses, systems, and methods disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

One embodiment is a unique hitch for operably connecting a tool with a towing vehicle. Other embodiments, forms, objects, features, advantages, aspects, and benefits shall become apparent from the following description and drawings.

DETAILED DESCRIPTION OF EXAMPLE EMBODIMENTS

Figure 1:
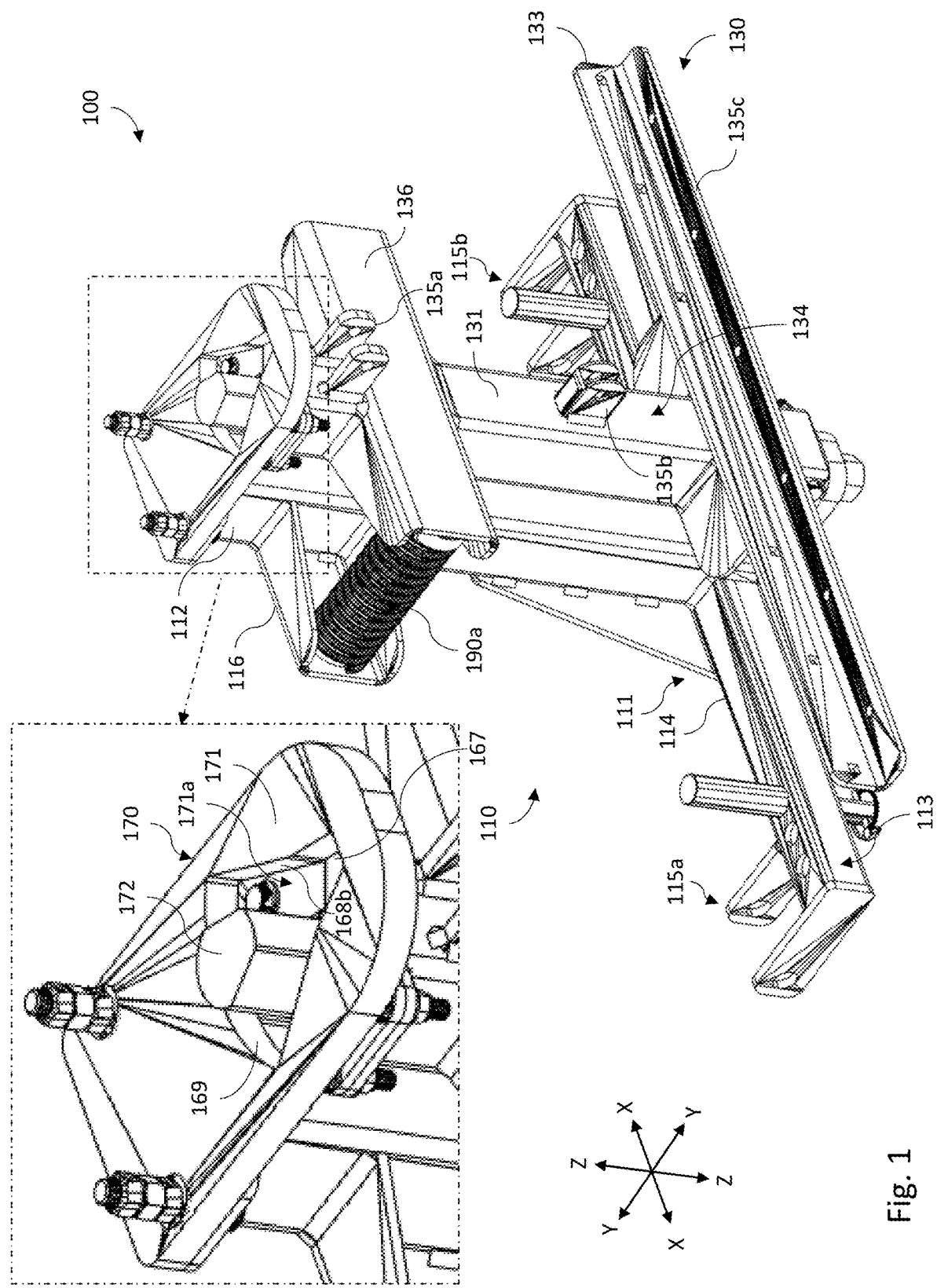
FIGS. 1, 2, and 3 are a perspective view, a side view, and a top view, respectively, of an example hitch in a first example state of adjustment.

With reference to FIGS. 1-3 and 9, there are illustrated several views of an example hitch 100 in a first example state of adjustment. Hitch 100 is one example of an apparatus for operably connecting a tool, for example, tool 10 (denoted generally in phantom in FIGS. 2 and 3 and depicted in a particular example form in FIG. 9), with a three-point hitch of a vehicle 20 which. It shall be appreciated that a three-point hitch refers to and includes a number of example hitches including three or more points of connection configured to couple a hitch with a work machine such as a tractor or various other vehicles or work machines as will occur to one of skill in the art with the benefit and insight of the present disclosure.

Hitch 100 includes a vehicle-side frame 110 and a tool-side frame 130. Vehicle-side frame 110 includes a first side 111 facing a forward direction and a second side 113 facing a rearward direction. As further described here, vehicle-side frame 110 may include a number of constituent components. Likewise, first side 111 may include respective first sides of such constituent components and second side 113 may include respective second sides of such constituent components.

Tool-side frame 130 includes a third side 132 facing in a forward direction and a fourth side 134 facing in a rearward direction. As further described here, tool-side frame 130 may include a number of constituent components. Likewise, third side 132 may include respective third sides of such constituent components and fourth side 134 may include respective fourth sides of such constituent components.

In the illustrated embodiment, vehicle-side frame 110 comprises a post 112 which extends in a generally vertical direction, a lower beam 114 which is coupled with post 112 extends in a generally horizontal direction, and an upper beam 116 which is coupled with post 112 and extends in a generally horizontal direction. With reference to the illustrated X-Y-Z coordinate system, depending on the adjustment and orientation of vehicle-side frame 110, the vertical direction may be exactly or generally along a Z-axis direction, the horizontal direction may be exactly or generally along an X-axis direction, and a longitudinal direction may be exactly or generally along an X-axis direction, it being appreciated that the degree of variance from the X-, Y-, and Z-axis directions may change as the vehicle-side frame 110 is adjusted, for example, in response to adjustment of a three-point hitch of vehicle 20 with which vehicle-side frame 110 may be coupled.

Vehicle-side frame 110 further comprises a plurality of hitch couplings 115a, 115b, 115c which are located on the first side 111 of the vehicle-side frame 110 and are configured to couple with respective couplings of the three-point hitch of vehicle 20. It shall be appreciated that vehicle-side frame 110 may be provided with a number of alternatives, modifications, and variations of the illustrated form including, for example, different numbers orientations and couplings of posts and beams, as various unitary structures such as a plate or other form, and with various other structures and couplings as will occur to one of skill in the art with the benefit and insight of the present disclosure.

In the illustrated embodiment, tool-side frame 130 comprises a post 131 which extends in a generally vertical direction, a lower beam 133 which is coupled with post 131 extends in a generally horizontal direction, and an upper beam 136 which is coupled with post 131 and extends in a generally horizontal direction.

With reference to the illustrated X-Y-Z coordinate system, depending on the adjustment and orientation of tool-side frame 130, the vertical direction may be exactly or generally along a Z-axis direction, the horizontal direction may be exactly or generally along an X-axis direction, and a longitudinal direction may be exactly or generally along an X-axis direction, it being appreciated that the degree of variance from the X-, Y-, and Z-axis directions may change as the tool-side frame 130 is adjusted, for example, in response to adjustment of a vehicle-side frame 110 with which tool-side frame 130 is be coupled. Furthermore, the degree of variance from the X-, Y-, and Z-axis directions may change to a greater extent or degree due to the additional range of motion provided by a pivotal or multi-axial coupling of vehicle-side frame 110 and tool-side frame 130.

Tool-side frame 130 further comprises a plurality of tool couplings 135*a*, 135*b*, 135*c* which are located on the fourth side 134 of the tool side frame 130 and are configured to couple with respective couplings of a towable tool, such as tool 10. It shall be appreciated that tool-side frame 130 may be provided with a number of alternatives, modifications, and variations of the illustrated form including, for example, different numbers orientations and couplings of posts and beams, as various unitary structures such as a plate or other form, and with various other structures and couplings as will occur to one of skill in the art with the benefit and insight of the present disclosure. It shall further be appreciated that the term towable tool refers to and includes a variety of tools including surface-working implements that are configured, oriented, and/or positioned to productively work an underlying ground surface in an intended direction or directions.

A pivot bearing 120 is located intermediate the first side 111 of the vehicle-side frame 110 and the third side 132 of the tool-side frame 130. The pivot bearing 120 is configured to provide multi-axial or pivoting-type motion between the vehicle-side frame 110 and tool-side frame 130. Accordingly, pivot bearing 120 provides a locus of pivotal engagement at the interface of its constituent bearing members. In the illustrated example, pivot bearing 120 is coupled with a tongue 119 of vehicle-side frame 110 extending in a generally rearward direction, and a post 131 of tool-side frame 130 extending in a generally vertical direction. In other forms, pivot bearing 120 may be coupled with other structures of vehicle-side frame 110 and/or other structures of tool-side frame 130.

Pivot bearing 120 includes a first pivot bearing member 121 and a second pivot bearing member 122 which are configured to slidably interface with one another and to accommodate the aforementioned multi-axial or pivoting-type motion. First pivot bearing member 121 is configured to selectably mate with (and in the illustrated is in a mating relationship with) second pivot bearing member 122 at a sliding interface between respective surfaces of first pivot bearing member 121 and second pivot bearing member 122. A retention member 123 is operatively coupled with and retains first pivot bearing member 121 and second pivot bearing member 122 in a mating relationship, In the illustrated example, retention member 123 is provided in the form of a retaining pin, but may also be provided in other forms, for example, as one or more bushings, clamps, clips, rings, snaps, tethers, or other retaining members as will occur to one of skill in the art with the benefit and insight of the present disclosure.

First pivot bearing member 121 includes a first bearing surface 121*a*. In the illustrated example, first pivot bearing member 121 is provided generally in the form of a spheroid-type bearing member with first bearing surface 121*a* being generally spheroid, more particularly in the form of a male ball hitch-type bearing member with first bearing surface 121*a* being a surface of a generally spherical ball. In other embodiments, first pivot bearing member 121 may be provided in a number of other forms, such as conical, frusto-conical, pin-type, or other non-spheroid forms; female spheroid or non-spheroid forms; or other forms as will occur to one of skill in the art with the benefit and insight of the present disclosure.

Second pivot bearing member 122 includes a second bearing surface 122*a*. In the illustrated example, second pivot bearing member 122 is provided generally in the form of a cup-type receptacle configured to receive a spheroid-type bearing member, such as first pivot bearing member 121. When so arranged, second bearing surface 122*a* slidably mates with first bearing surface 121*a* to accommodate the aforementioned multi-axial or pivoting-type motion. In other embodiments, second pivot bearing member 122 may be provided in a number of other forms, such as other cup or non-cup shapes configured to receive and interface with conical, frusto-conical, pin-type, or other non-spheroid forms of first pivot bearing member 121; male spheroid or non-spheroid forms; or other forms as will occur to one of skill in the art with the benefit and insight of the present disclosure.

A number of alternatives, modifications, and variations of the illustrated form of pivot bearing 120 are contemplated. For example, in any of the various forms herein, the female-male relationship of first pivot bearing member 121 and second pivot bearing member 122 may be reversed from that of the illustrated embodiment. Furthermore, various other forms and types of pivot bearings may be utilized including, for example, cantilevered pivot bearings, flanged pivot bearings, flexure pivot bearings, knife-edge bearings, multi-axial hinges, needle bearings, or other forms and types of pivoting or multi-axial bearings as will occur to one of skill in the art with the benefit and insight of the present disclosure.

Hitch 100 further includes a key-lock pairing 170 (also referred to herein as pairing 170) which is located intermediate the first side 111 of the vehicle-side frame 110 and the third side 132 of the tool-side frame 130. Pairing 170 is configured to accommodate a constrained or defined range of motion between vehicle-side frame 110 and tool-side frame 130. More particularly, pairing 170 includes a lock member 171 and a key member 172 which is received by an aperture 171*a* defined by lock member 171 and is constrainedly moveable therein.

In the illustrated embodiment, lock member 171 is coupled with vehicle-side frame 110 and extends in a generally rearward direction. More particularly, lock member 171 is coupled with a post 112 of vehicle-side frame 110 which extends in a generally vertical direction. In other embodiments, lock member 171 may be coupled and may extend from other structures of vehicle-side frame 110.

It shall be appreciated that lock member 171 is one example of a key receiver according to the present disclosure. A number of other types and configurations of key receivers are also contemplated. Some such forms include key receivers which are or include lock members with apertures of different dimensions, shapes, and/or positionings than those of lock member 171 and aperture 171*a*. Some such forms include key receivers with apertures configured to accommodate different ranges of motion of received keys than those of lock member 171 and aperture 171*a*. Some such forms include key receivers with apertures configured to provide different key member locking positions relative to those of lock member 171 and aperture 171*a*, or to provide a constrained but non-locking of a key member.

In the illustrated embodiment, key member 172 is coupled with tool-side frame 130 and extends in a generally vertical direction. More particularly, key member 172 is coupled with and extends from post 131 of tool-side frame 130. In other embodiments, key member 172 may be coupled and may extend from other structures of tool-side frame 130.

Hitch 100 further includes a spring arrangement 190 including springs 190*a*, 190*b* which are positioned intermediate and coupled with upper beam 116 of vehicle-side frame 110 and upper beam 136 of tool-side frame 130. In the illustrated embodiment, springs 190*a*, 190*b* are coupled with and abut horizontally spaced apart surface portions of upper beam 116 on second side 113 of vehicle-side frame 110. Springs 190*a*, 190*b* are further coupled with and abut horizontally spaced apart surface portions of upper beam 136 on third side 132 of tool-side frame 130, and these horizontally spaced apart surface portions generally face and oppose the horizontally spaced apart surface portions of upper beam 116. In other embodiments, springs 190*a*, 190*b* may be coupled with and may abut different portions of upper beam 116 and upper beam 136, or may be coupled with and may abut with different structures of vehicle-side frame 110 and tool-side frame 130.

In the illustrated embodiment, springs 190*a*, 190*b* are illustrated in the form of coil or helical springs. In other embodiments, spring arrangement 190 may be provided in other forms including, for example, Belleville springs, compression springs, constant force springs, disc springs, drawbar springs, elastomeric springs, extension springs, flat springs, gas springs, helical springs, leaf springs, tension springs, torsion springs, and volute springs, and as will occur to one of skill in the art with the benefit and insight of the present disclosure.

Figure 2:
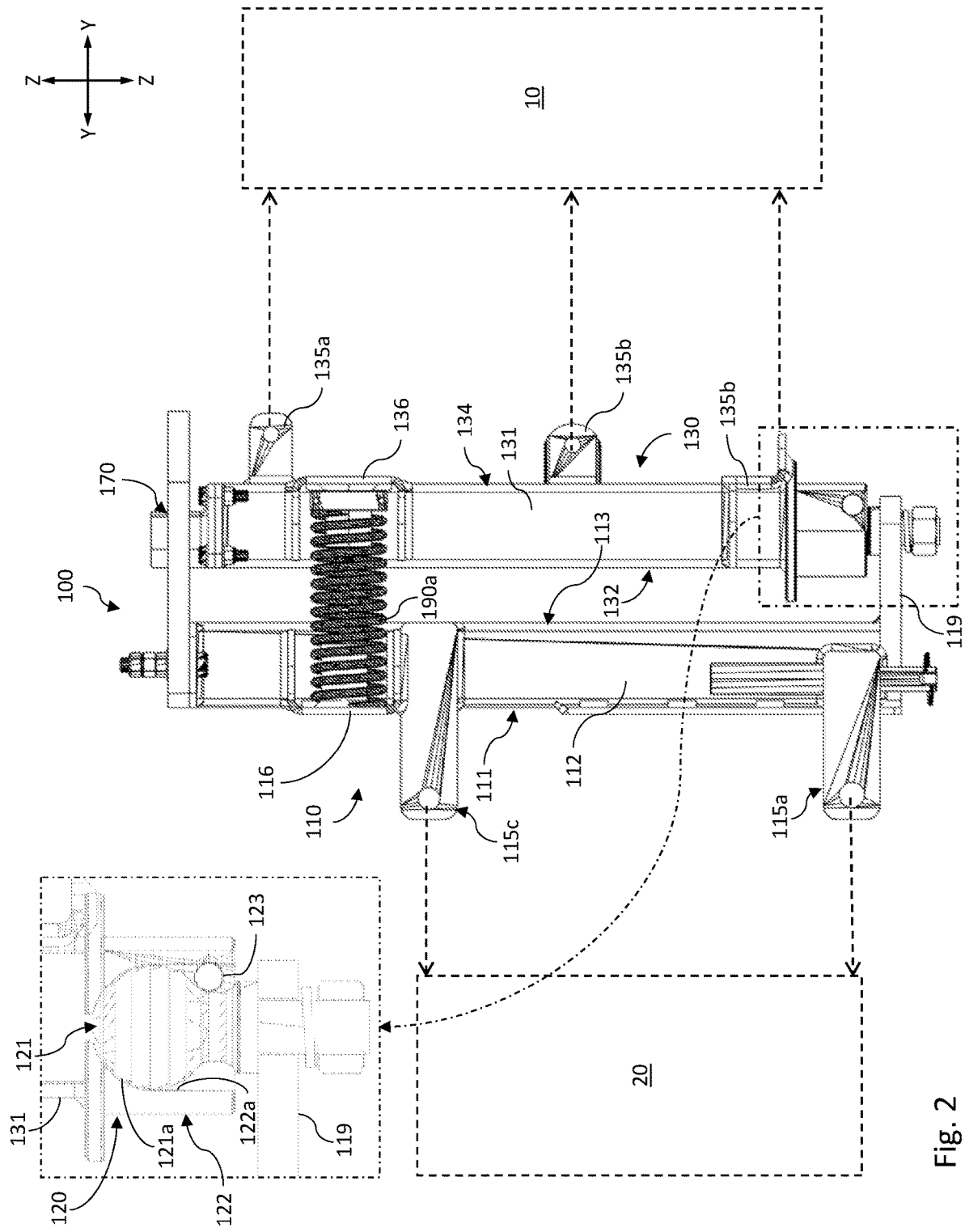
Figure 3:
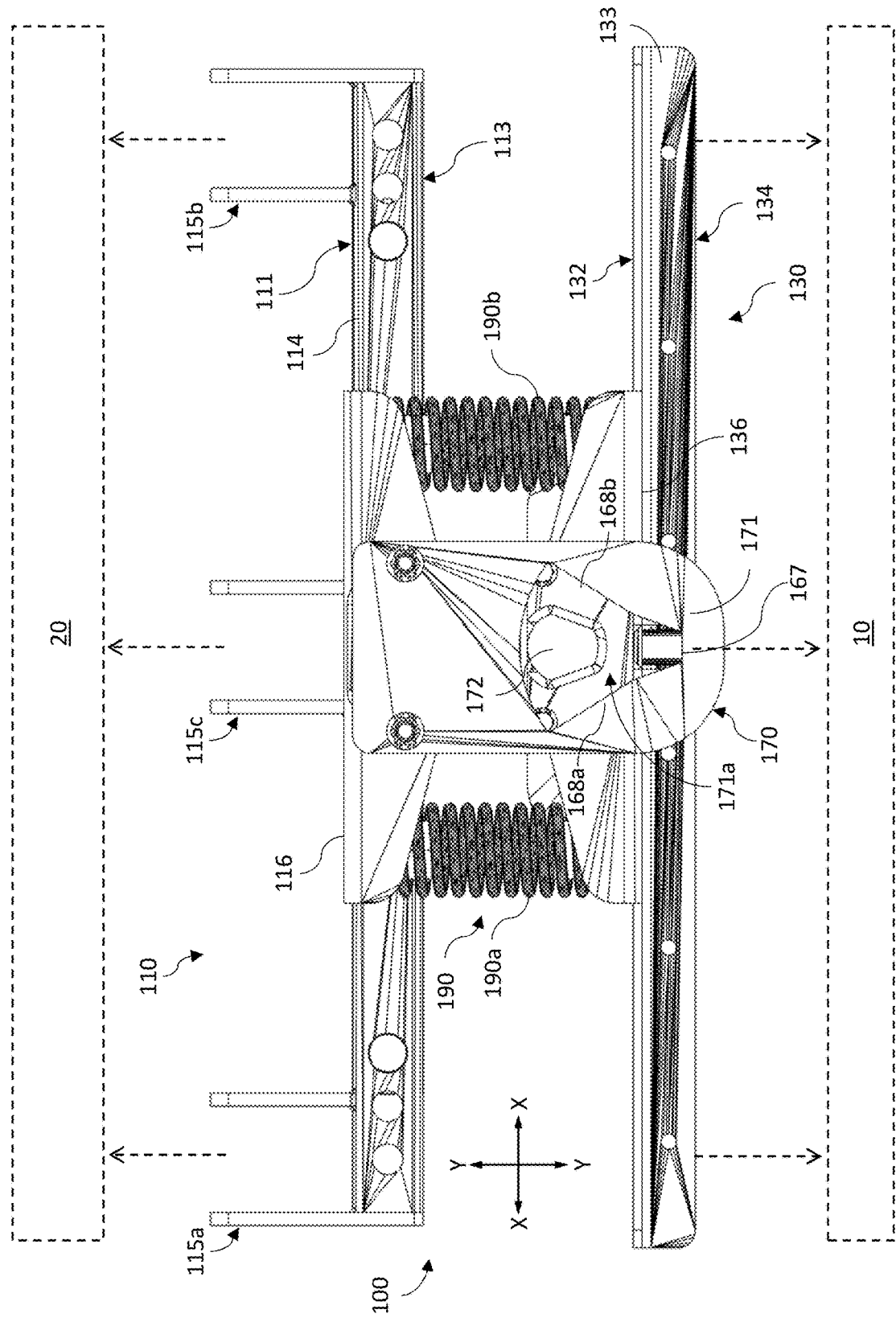
Figure 4:
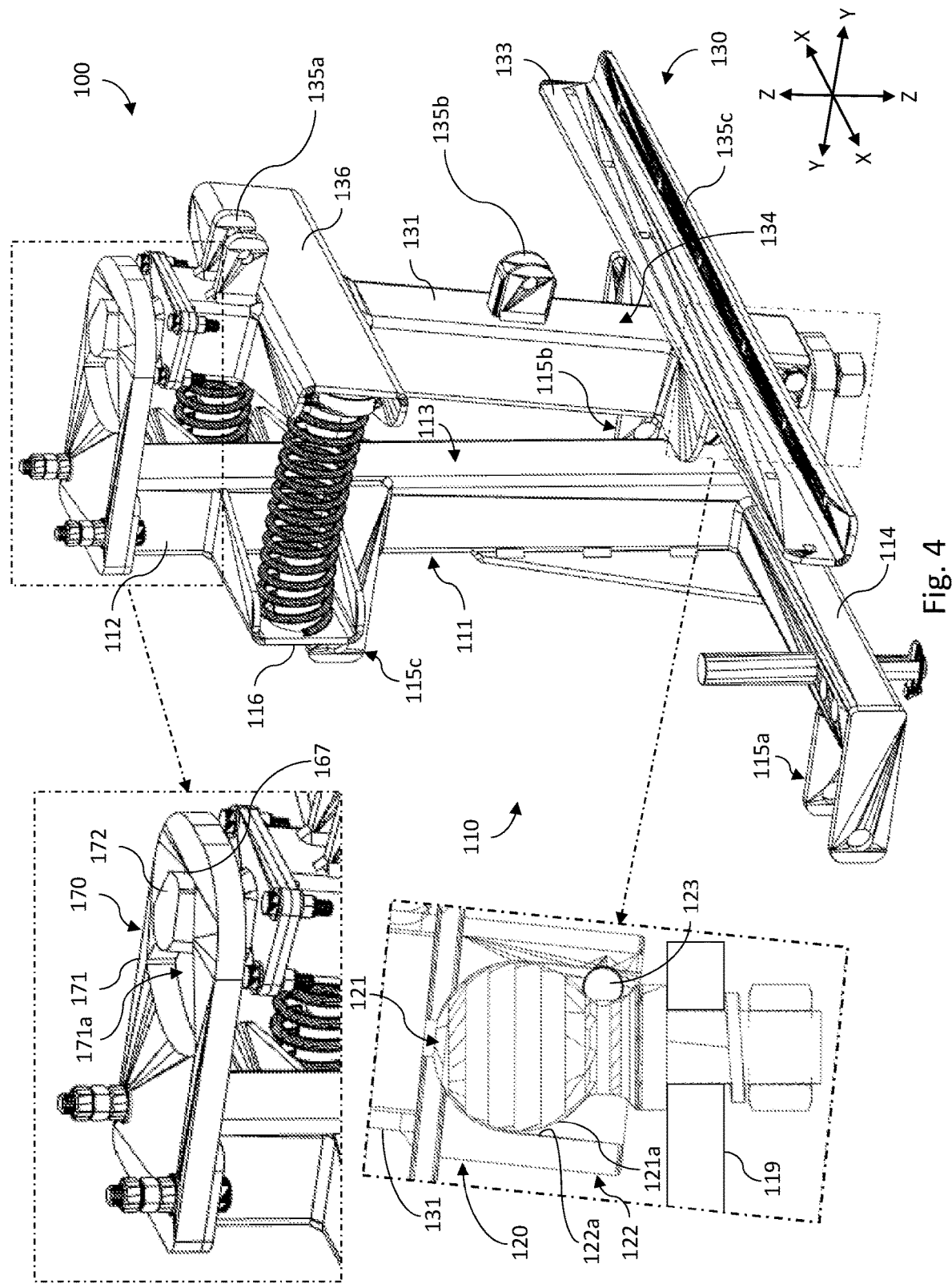
FIGS. 4, 5, and 6 are a perspective view, a side view, and a top view, respectively, of the example hitch in a second example state of adjustment.
Figure 5:
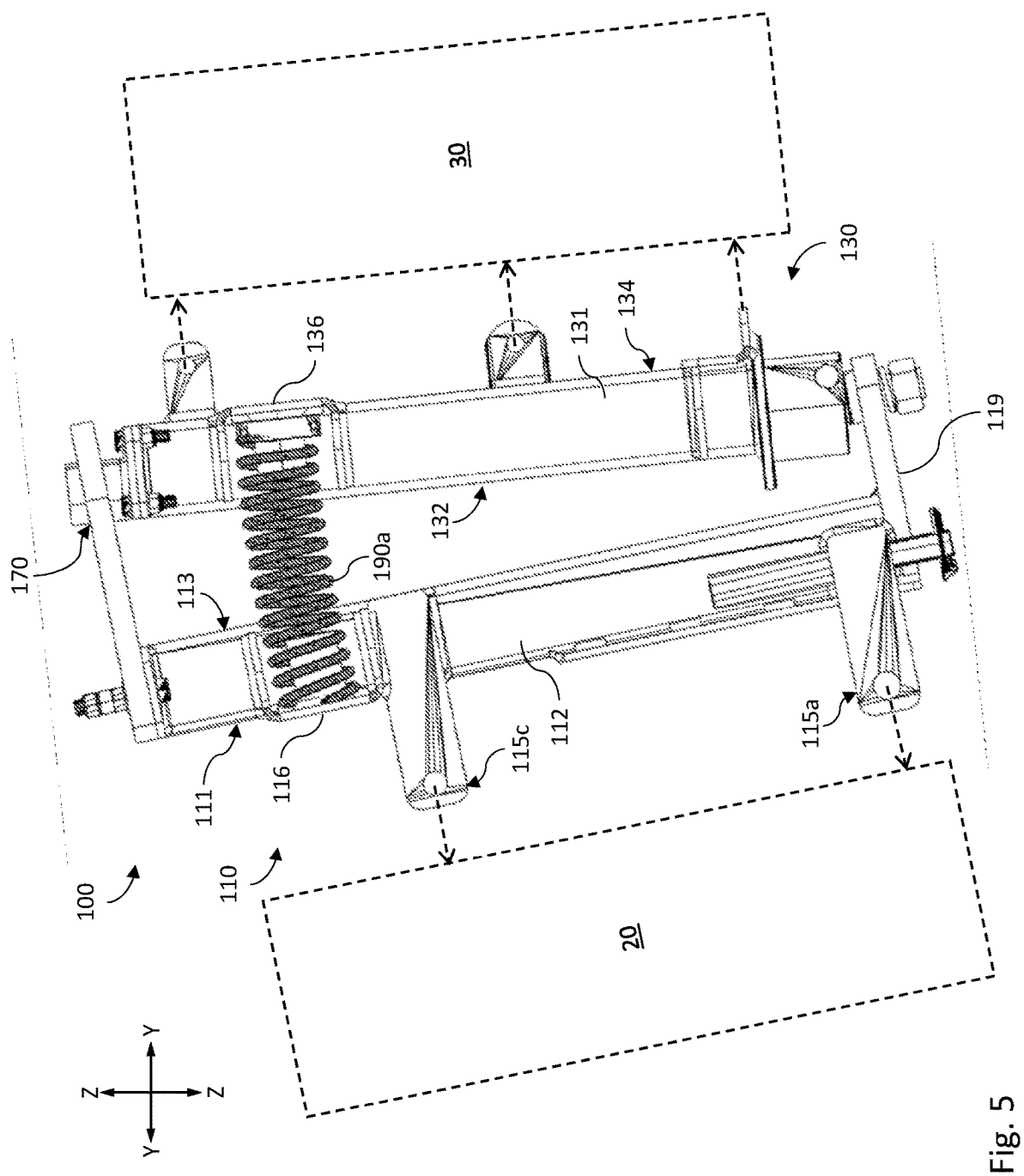
Figure 6:
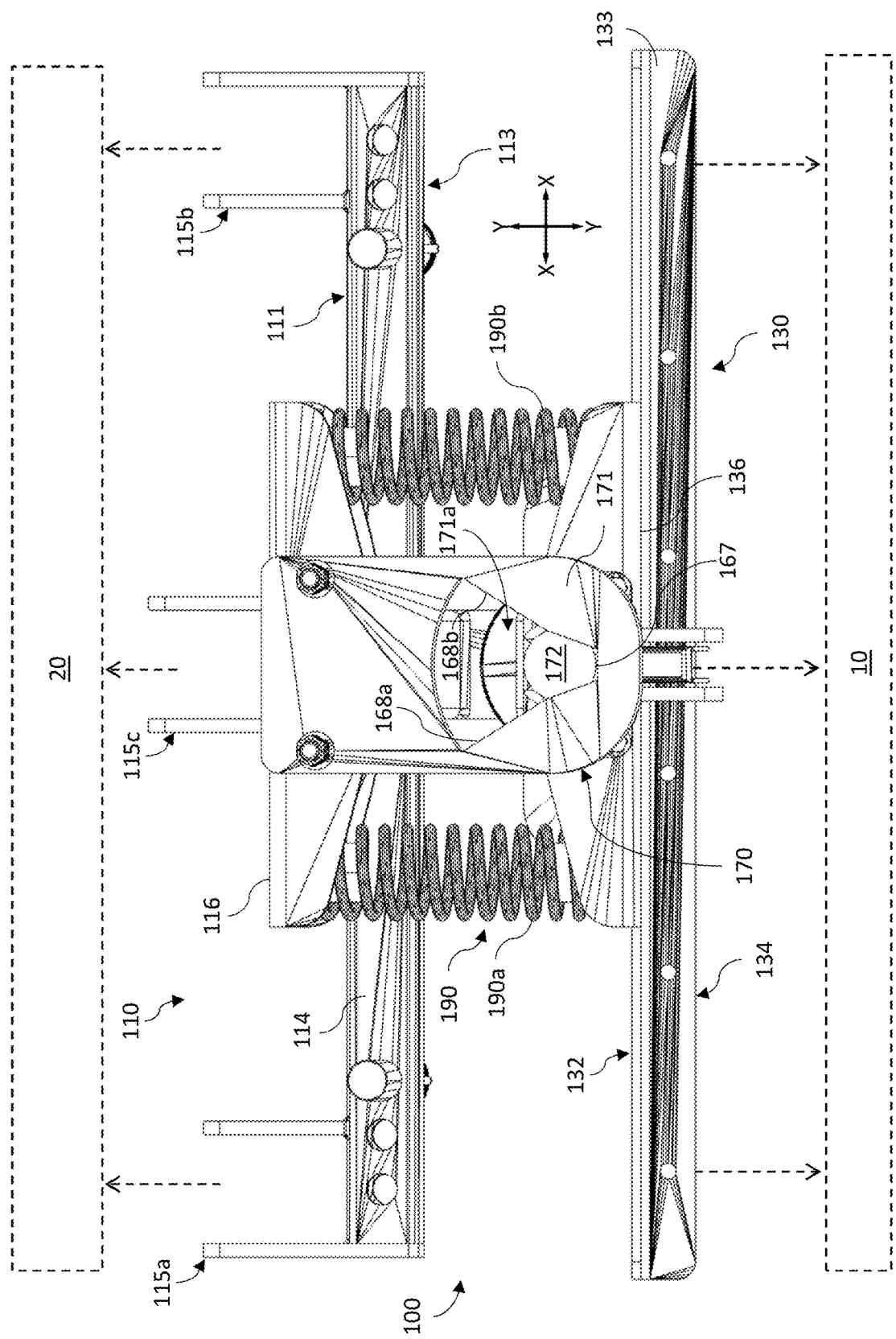

Pivot bearing 120, key-lock pairing 170, and spring arrangement 190 are configured and structured to operate cooperatively or in combination to provide for self-alignment and engagement biasing of hitch 100. For example, in the first example state of adjustment illustrated in FIGS. 1, 2, and 3, tool-side frame 130 is pivoted about pivot bearing relative to vehicle-side frame 110 such that the vertically upper portion of tool-side frame 130 and key member 172 urged toward vehicle-side frame 110. It shall be appreciated that the first example state of adjustment illustrated in FIGS. 1, 2, and 3 is one example of a lowered or engaged state of adjustment according to the present disclosure.

In the first example state of adjustment, springs 190*a*, 190*b* are compressed and exert biasing force urging the vertically upper portion of tool-side frame 130, including key member 172, in a rearward and downward direction away from vehicle-side frame 110. As further illustrated in FIG. 9, when a tool, such as the illustrated tool 10, is operatively coupled with the hitch 100, the first example state of adjustment provides a biasing force that urges one or more surface working implements of tool 10 (e.g., rollers 11, 12, harrow blades 13, 14, or spikes 15, 16*d*) into engagement with an underlying ground surface GS.

In addition to providing a tool engagement biasing force, the first example state of adjustment accommodates rotational motion of tool-side frame 130 about pivot bearing 120 relative to vehicle-side frame 110. Thus, for example, tool-side frame 130 can rotate about pivot bearing 120 relative to vehicle-side frame 110 from first positioning of the first example state of adjustment illustrated in FIGS. 1, 2, 3, and 9, to second positioning of a second example state of adjustment in FIGS. 7, 8, and 11.

A range of such rotational motion is defined and controlled by the shape and dimensions of the aperture 171*a* in which the key member 172 is positioned and moved. In the illustrated example, the aperture 171*a* is shaped such that a maximum range of rotational motion of key member 172 is provided along a curved surface 169 defined at the forward most extremity of the aperture 171*a* of the lock member 171. In the illustrated curved surface 169 is provided in the form of a generally arcuate surface, it being appreciated that curved surface 169 may also be provided in other curved or partially curved forms. It shall be also appreciated that the second example state of adjustment is one example of a rotated state of adjustment and that a plurality of other rotated states of adjustment can also be realized by the illustrated embodiment.

In the illustrated embodiment, the aperture 171*a* of key member 172 is provided in a baseball diamond-shaped form, generally in accordance with the playing area of a typical baseball field. In this form, the forward extremity of the aperture 171*a*, which is defined by curved surface 169, is of a position, shape, and proportion similar to an outfield wall of a baseball field. The rearward extremity of the aperture 171*a*, which is defined by locking terminus surface 167, is of a position, shape, and proportion similar to the home plate of a baseball field. Side surfaces 168*a*, 168*b*, which extend intermediate the rearward extremity and a forward extremity of aperture 171*a*, are of a position, shape, and proportion similar to the foul lines of a baseball field. While generally linear, side surfaces 168*a*, 168*b* include a discontinuity at which the angles of forward portions of side surfaces 168*a*, 168*b* increase to a degree greater than that of the rearward portions of side surfaces 168*a*, 168*b*, similar to if the base line portion of the foul lines was angled differently from the outfield portion of the foul lines. The discontinuity at which the angles of forward portions of side surfaces 168*a*, 168*b* increase to a degree greater than that of the rearward portions of side surfaces 168*a*, 168*b* have been determined by the inventors to have a unexpected improvement in guiding the key member 172 from the forward extremity of aperture 171*a* where the key member 172 is provided with maximum freedom of motion to the rearward extremity of aperture 171*a* where the key member 172 may be urged into locking engagement with locking terminus surface 167 of aperture 171*a* to provide a center-locking or retaining feature for tool-side frame 130 (and tool 10 when coupled therewith).

In the second example state of adjustment, spring 190*a* is extended (and may be decompressed or distended) relative to the first example state of adjustment. In contrast, spring 190*b* is compressed relative to the first example state of adjustment. Such a state of adjustment may occur, for example, when a vehicle such as vehicle 20 with which hitch 100 is coupled performs a turning operation while towing hitch 100. In the second example state of adjustment, the spring arrangement 190 may still provide tool engagement biasing force of the type described in connection with the first example state of adjustment, for example, via spring 190*b*.

In the second example state of adjustment, the spring arrangement 190 further provides a degree centering rotational bias urging the tool-side frame 130 (and tool 10 when coupled with tool-side frame 130) toward a central or centered position. This biasing force may aid in the re-centering of tool-side frame 130 and tool 10, for example, toward or at the end of a turning operation of a vehicle such as vehicle 20 with which hitch 100 is coupled.

Figure 7:
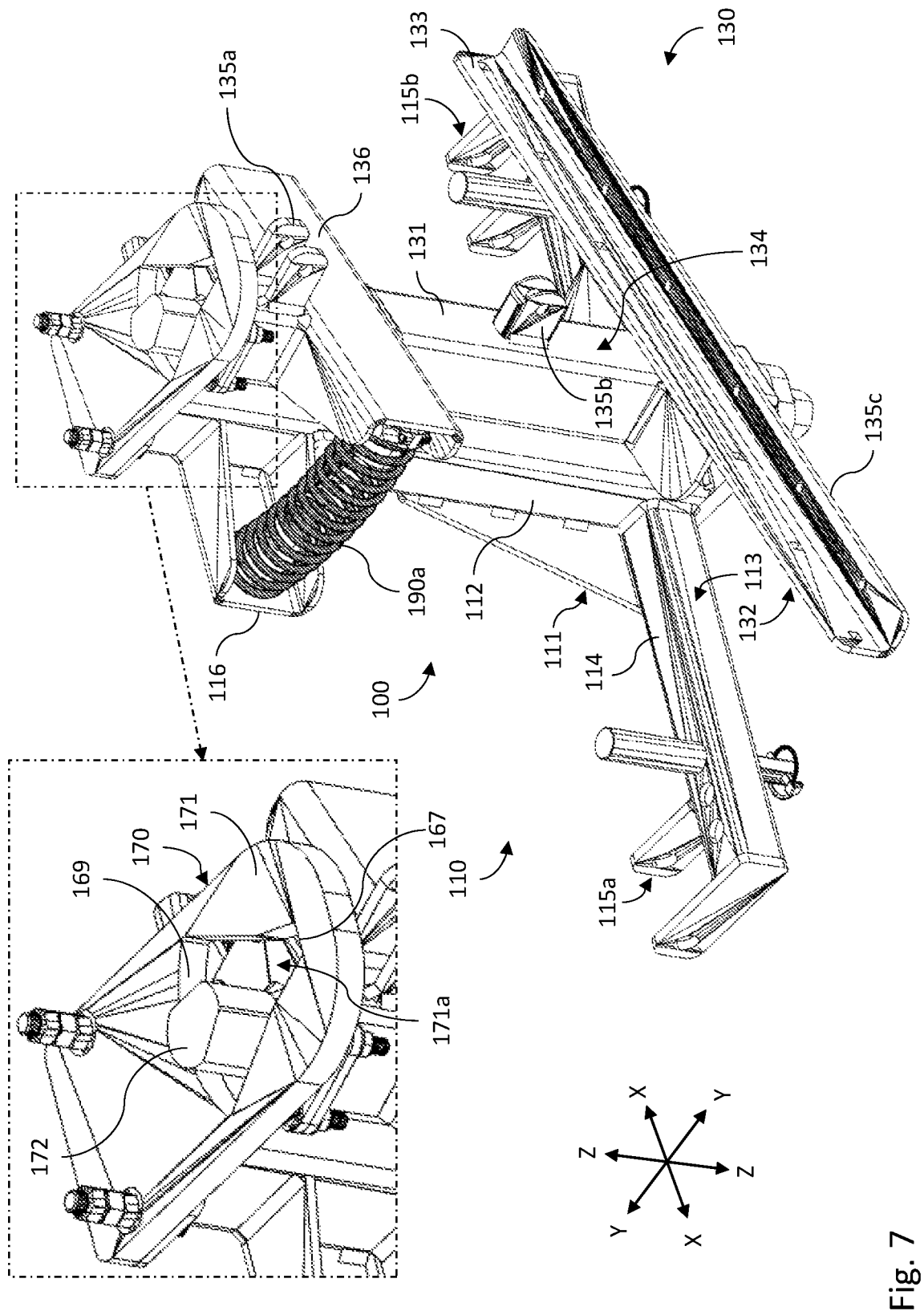
FIGS. 7 and 8 are a perspective view and a top view, respectively, of the example hitch in a third example state of adjustment.
Figure 8:
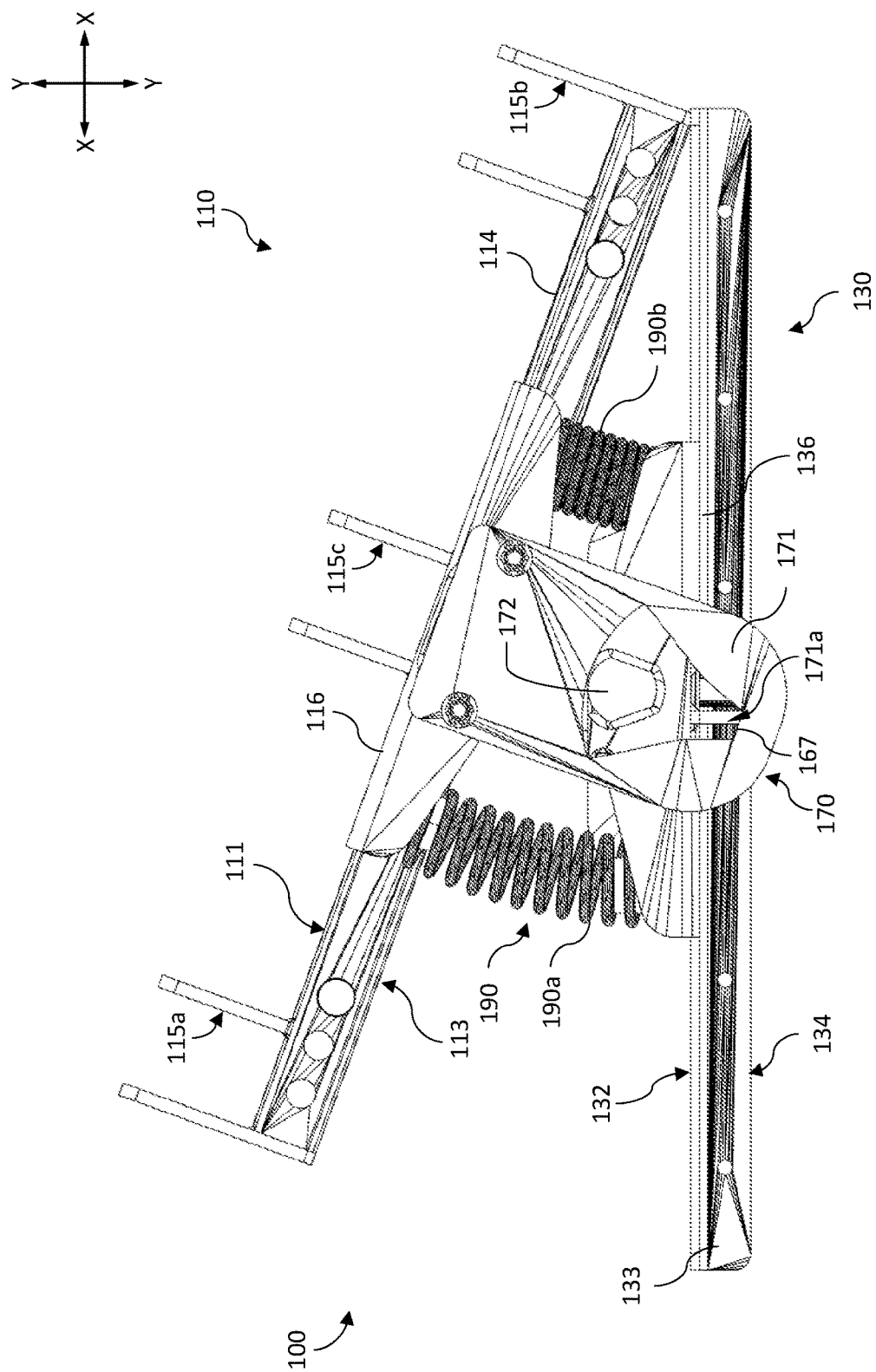
Figure 9:
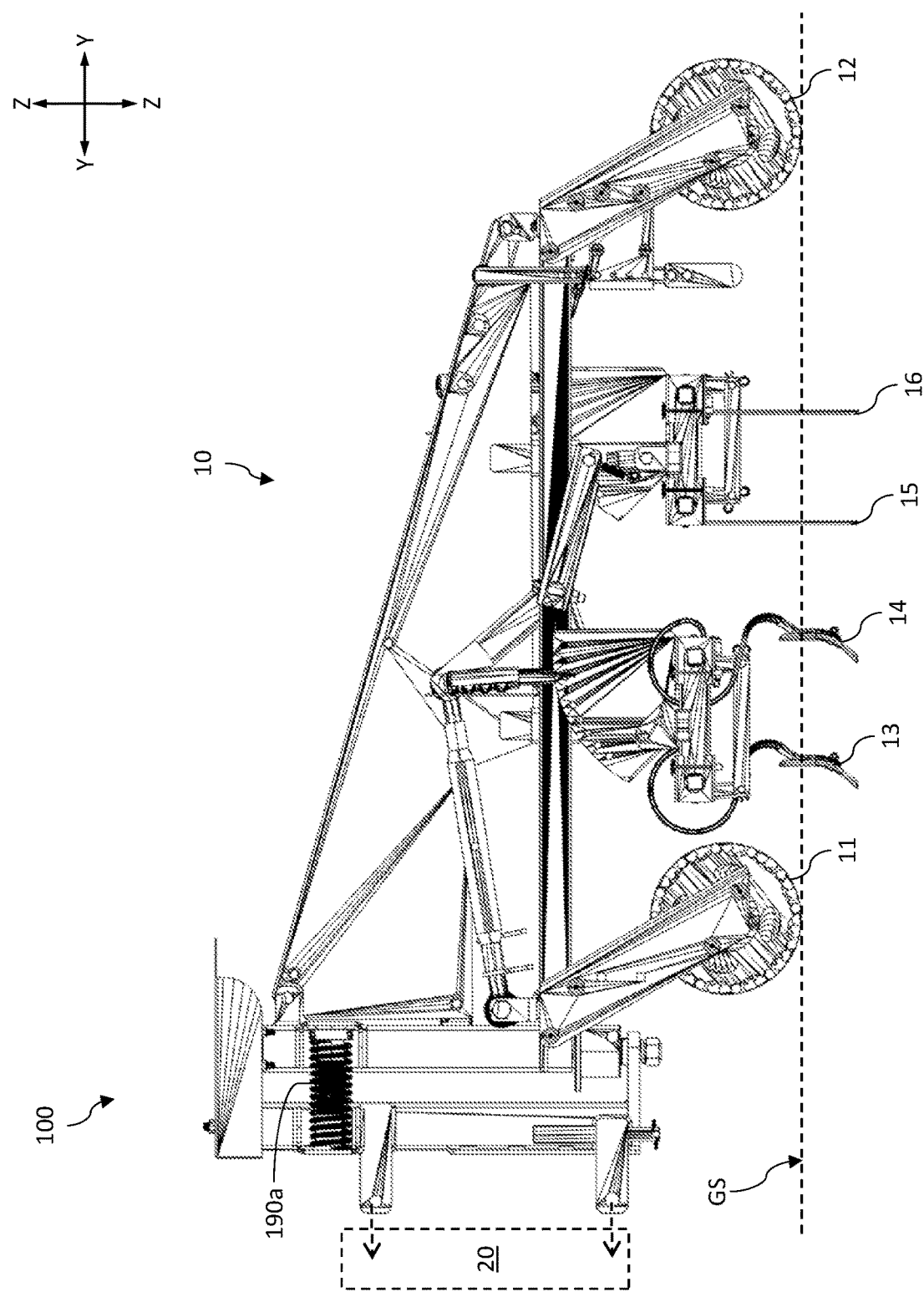
FIG. 9 is a side view of the example operatively coupled with an example tool in the first state of adjustment and operatively coupled with a tool.
Figure 10:
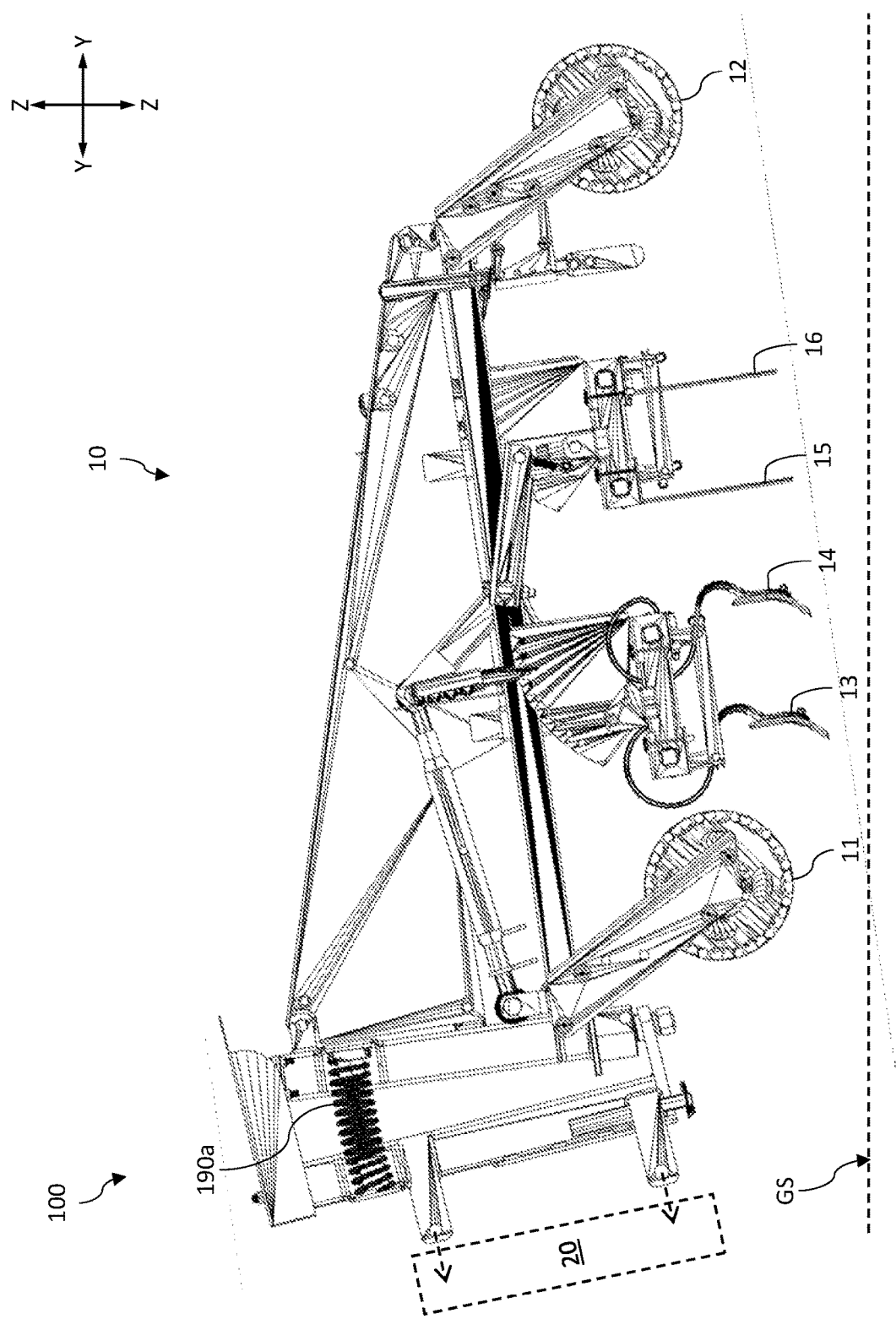
FIG. 10 is a side view of the example hitch operatively coupled with the example tool in the second state of adjustment and operatively coupled with a tool.
Figure 11:
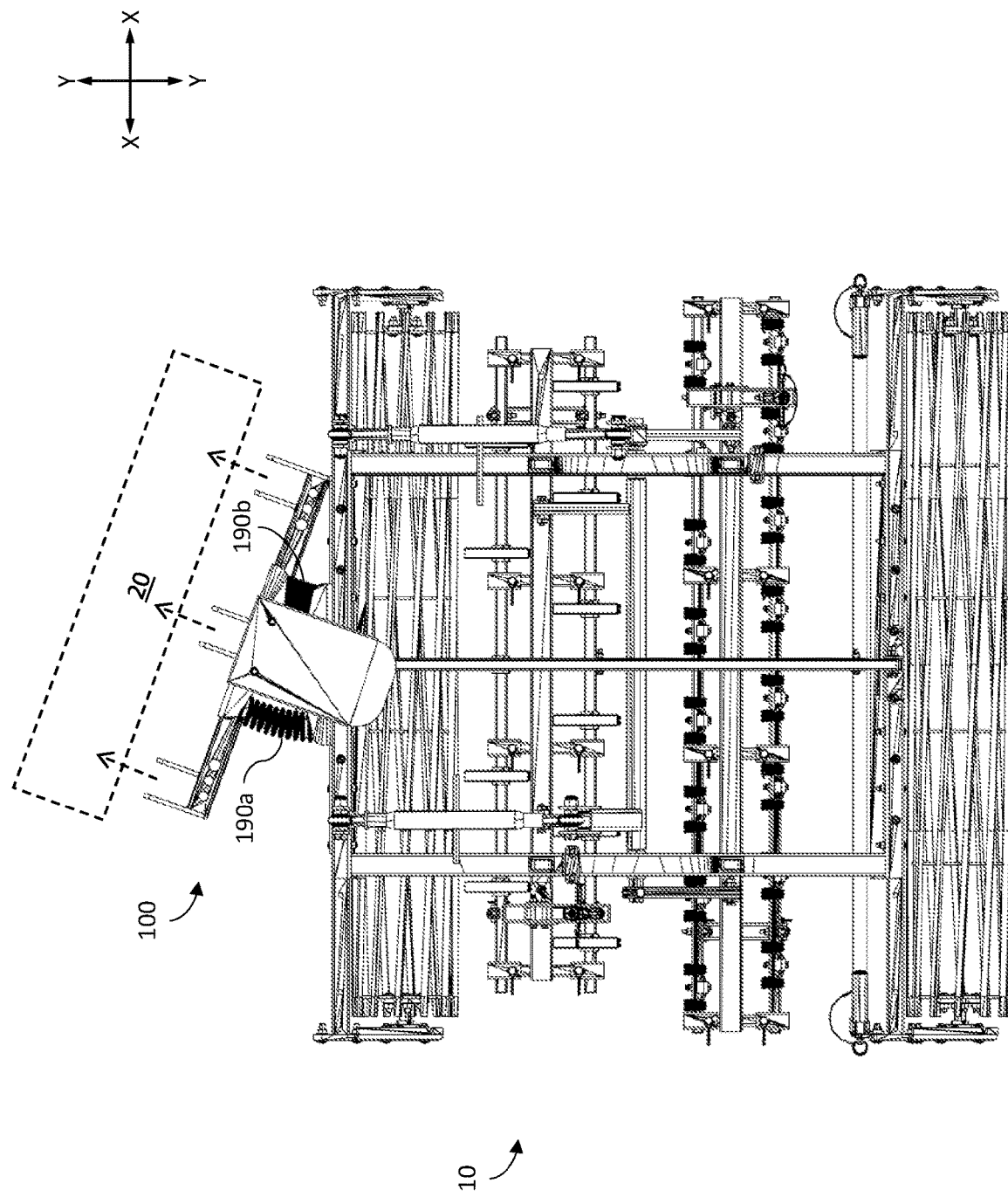
FIG. 11 is a top view of the example hitch operatively coupled with the example tool in the third state of adjustment and operatively coupled with a tool.

It shall be appreciated that the first example state of adjustment illustrated in FIGS. 1, 2, 3, and 9, and the second example state of adjustment illustrated in FIGS. 7, 8, and 11 are examples of lowered engaged state of adjustment according to the present disclosure. In contrast, the third state of adjustment illustrated in FIGS. 4, 5, 6, and 10, is an example of a raised or disengaged state of adjustment. A raised state of adjustment may be provided, for example, by adjusting a three-point tool hitch of a vehicle 20 to a raised position, such as the position most dramatically illustrated in FIG. 5, effective to adjust and position vehicle-side frame 110 in a corresponding raised position and thereby provide the illustrated positioning of tool-side frame 130 (and tool 10 when coupled with tool-side frame 130). Likewise, a lowered state of adjustment may be provided, for example, by adjusting a three-point tool hitch of a vehicle 20 to a lowered position, such as the position most dramatically illustrated in FIG. 2, effective to adjust and position vehicle-side frame 110 in a corresponding raised position and thereby provide the illustrated positioning of tool-side frame 130 (and tool 10 when coupled with tool-side frame 130).

Adjustment from a lowered or engaged position to a raised position also provides auto-centering of the tool-side frame 130 (and tool 10 when coupled with tool-side frame 130). The shapes and dimensions of aperture 171a and key member 172 may be selected to provide such auto-centering. When vehicle-side frame 110 is adjusted to a raised position, the key member 172 is advanced in a rearward direction of aperture 171a. Since aperture 171a narrows in the rearward direction, contact between the key member 172 and one of the side surfaces 168a, 168b of the aperture 171a imparts a centering rotational force on tool-side frame 130 via key member 172.

As key member 172 progresses rearward along aperture 171a, the side surfaces 168a, 168b narrow until key member 172 reaches the locking terminus surface 167 of aperture 171a. In the illustrated example, locking terminus surface 167 is configured with dimensioned and aligned surfaces of aperture 171a complementary to corresponding surfaces of key member 172. Thus, key member 172 can be seated against locking terminus surface 167. Such seating may provide alignment of opposing surfaces of key member 172 and locking terminus surface 167. Furthermore, the mass or weight of the tool-side frame 130 (and tool 10 when coupled therewith) provides force that urges key member 172 into locking engagement with locking terminus surface 167 of aperture 171a to provide a center-locking or retaining feature for tool-side frame 130 (and tool 10 when coupled therewith).

In the illustrated example, key member 172 is provided with angled flat sides configured to mate tightly with corresponding sides of locking terminus surface 167 of aperture 171a. Other embodiments, may include other selectable lockable interfacing surfaces and structures as will occur to one of skill in the art with the benefit and insight of the present disclosure.

The foregoing features cooperation thereof provide for auto-centering of the tool-side frame 130 (and tool 10 when coupled with tool-side frame 130) when the tool is moved from any lowered position (e.g., the lowered position of the first example state of adjustment, the second example state of adjustment, or another lowered state of adjustment) to a raised position. Thus, for example, starting from a rotated, lowered or engaged position, an operator may adjust a three-point hitch of vehicle 20 to raise tool-side frame 130. In response to such adjustment, the aforementioned centering will urge the tool-side frame 130 (and tool 10 when coupled with tool-side frame 130) into a centered position. Additionally, the aforementioned centering rotational bias provided by spring arrangement 190 can assist to some extent with auto-centering of the tool-side frame 130 (and tool 10 when coupled with tool-side frame 130) when the tool 10 is raised above the underlying ground surface GS and no longer provides resistance to the centering rotational bias provided by spring arrangement 190.

A number of mechanisms may be provided to limit motion of the tool side frame in several respects. In one respect a mechanism may be provided for limiting motion of the tool side frame when the tool is moved to a raised and the key member 172 is mated with corresponding sides of locking terminus surface 167 of aperture 171a. Some examples of such mechanisms include plugs which may be sized and shaped to partially or completely occupy a forward portion of the aperture 171a not occupied by key member 172 when located in rearward position or to occupy at least a perimeter portion thereof. Some examples of such mechanisms include clamps or braces engaging upper beam 116 and upper beam 136 and maintaining upper beam 116 and upper beam 136 in a fixed position relative to one another and which may be attached upper beam 116 and upper beam 136 at locations on one or both sides of poste 112 and post 131 such as location proximate one or both of spring 190a and spring 190b.

Figure 12:
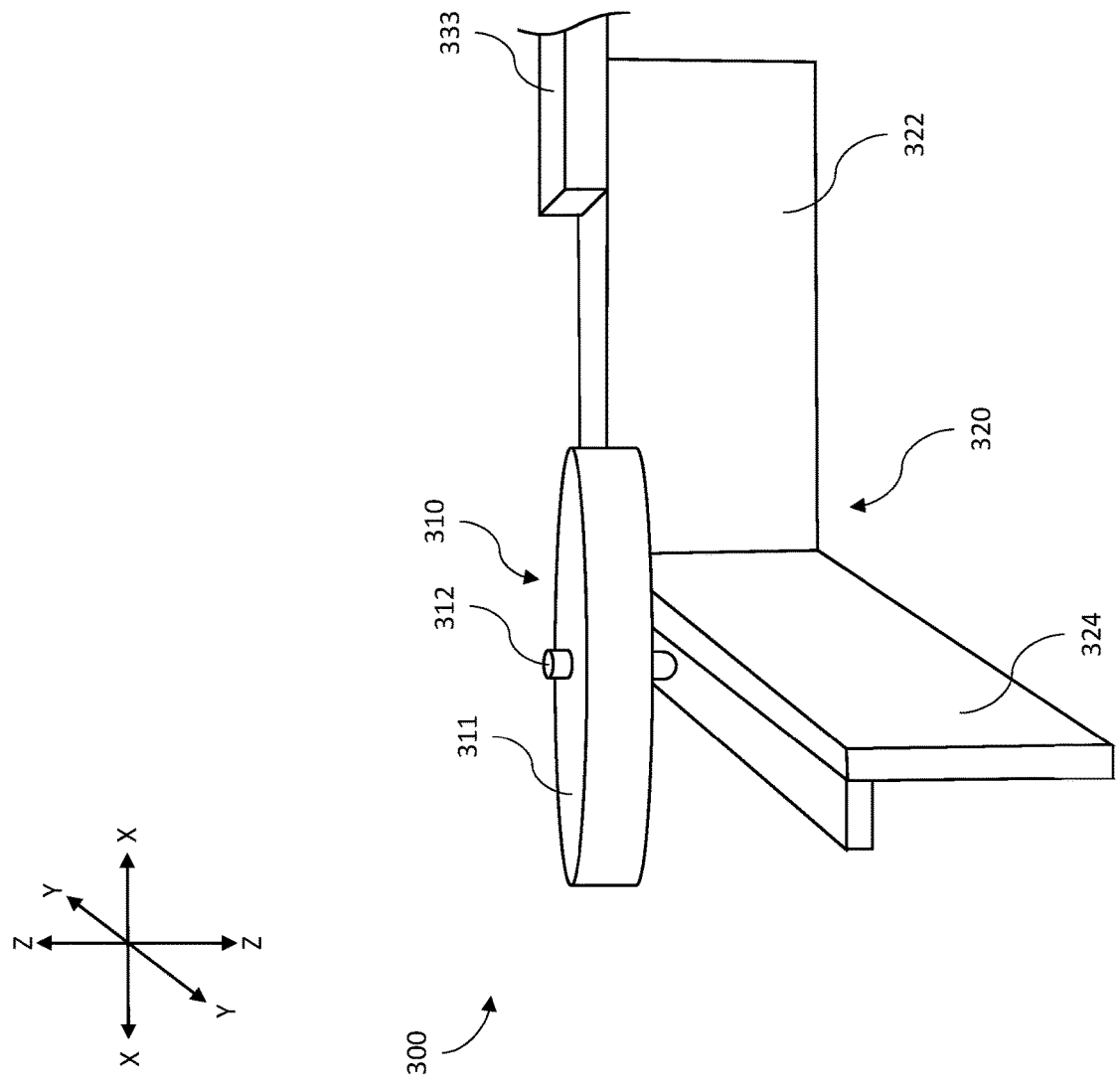
FIG. 12 is a perspective view of an example side rail blade attachment configured for use with the example hitch.

In another respect the tool-side frame 130 or the tool coupled therewith may be operatively coupled with a side rail blade attachment, such as side rail blade attachment 300 illustrated in FIG. 12. Side rail blade attachment 300 includes a roller assembly 310 including a roller 311 configured to rotate about an axle 312 that is attached to a scraper body 320. Roller 311 is positioned and configured to contact a side rail or wall structure to limit and guide motion of the tool-side frame 130 and a tool coupled therewith relative to the side rail or wall structure. The side rail blade attachment 300 may be selectably coupled with the tool-side frame 130 or to a tool attached to the tool side frame 130 by mounting bracket 333. The side rail blade attachment 300 includes a working blade 320 a forward extending blade portion 324 and a laterally extending blade portion 322. Working blade 320 is configured to collect material that has accumulated next to the side rail or wall structure and redirect or redistribute the collected material away from the side rail or wall structure.

While exemplary embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred, or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus for operatively coupling a towable tool with a work machine via a three-point hitch, the apparatus comprising:
   a vehicle-side frame comprising
      a first side and a second side, the first side facing forward and the second side facing rearward, a plurality of hitch couplings located on the first side and configured to couple with respective couplings of a three-point hitch, a first pivot bearing member located on the second side, a key receiver located on the second side at a location vertically spaced apart from the first pivot and horizontally and longitudinally aligned with the first pivot bearing member such that a line extending vertically from the first pivot passes through the key receiver; and a tool-side frame comprising a third side and a fourth side, the third side facing forward and the fourth side facing rearward, one or more tool couplings located on the first fourth side and configured to couple with one or more respective couplings of a tool, a second pivot bearing member located on the third side and pivotably engaged with the first pivot bearing member, and a key member located on the third side and extending into the key receiver; and at least one spring positioned intermediate and operatively coupled with the second side and the third side, the spring biasing the tool-side frame away from the vehicle-side frame;

wherein the tool-side frame is pivotable about an interface between the first pivot bearing member and the second pivot bearing member over a first range of motion over which the key member travels between a forward extremity of the key receiver and a locking terminus surface defined at a rearward extremity of the key receiver, and the key member includes angled flat sides configured to mate with corresponding angled flat sides of the locking terminus surface when the key member is positioned at the rearward extremity of the key receiver.

2. The apparatus of claim 1, the forward extremity of the key receiver limits rotation of the tool side frame relative to the vehicle-side frame to a lesser degree than the rearward extremity of the key receiver.

3. The apparatus of claim 2, wherein the forward extremity of the key receiver limits rotation of the tool side frame relative to the vehicle-side frame by limiting motion of the key member to a length of an aperture boundary surface.

4. The apparatus of claim 2, wherein the rearward extremity of the key receiver limits rotation of the tool side frame relative to the vehicle-side frame by limiting motion of the key member to a substantially locked position defined by the locking terminus surface.

5. The apparatus of claim 2, wherein a biasing force of the spring biasing the tool-side frame away from the vehicle-side frame varies over the first range of motion.

6. The apparatus of claim 5, wherein the biasing force of the spring biasing the tool-side frame away from the vehicle-side frame is greatest at the forward extremity of the first range of motion.

7. The apparatus of claim 1, wherein the vehicle-side frame includes a first post extending in a generally vertical direction and a first beam coupled with the post and coupled with the at least one spring member, and the tool-side frame includes a second post extending in a generally vertical direction, a second beam coupled with the post and coupled with the at least one spring member.

8. The apparatus of claim 7, the at least one spring member comprises a first spring and a second spring, the first spring coupled with the first beam and the second beam at respective first coupling locations, the second spring coupled with the first beam and the second beam at respective second coupling locations, the respective first coupling locations being spaced apart from the respective second coupling locations.

9. The apparatus of claim 1, wherein the key receiver defines a baseball diamond-shaped aperture with a curved surface at the forward extremity, and linear side surfaces extending intermediate the rearward extremity and the forward extremity.

10. The apparatus of claim 1, wherein the key receiver includes linear side surfaces extending rearward from the forward extremity, the linear side surfaces being at different angles than the angled flat sides of the locking terminus surface.

11. The apparatus of claim 1, wherein the vehicle-side frame is operatively coupled with a three-point hitch of a vehicle.

12. The apparatus of claim 1, wherein the tool-side frame is operatively coupled with a towable tool.

13. A hitch apparatus comprising:

a first frame operatively coupled with a second frame by a pivot bearing, the first frame being pivotable relative to the second frame about a locus of pivotal engagement of the pivot bearing;

a plurality of hitch couplings coupled with the first frame and configured to couple with respective couplings of a three-point hitch;

one or more tool couplings coupled with the second frame and configured to couple with one or more respective couplings of a tool;

a key-lock pairing including a first component coupled with the first frame, and a second component coupled with the second frame, one of the first component and the second component receiving and limiting a range of motion of the other of the first component and the second component, the key-lock pairing being horizontally and longitudinally aligned with the pivot bearing such that a vertical line extending from the pivot bearing passes through a key receiver of the key-lock pairing, the first component and the second component including respective angled flat sides configured to mate with one another when one of the first component and the second component contacts a locking terminus surface provided at a rearward extremity of the other of the first component and the second component; and a spring arrangement operatively coupled with and extending between the first frame and the second frame, the spring arrangement biasing the first frame relative to the second frame in at least one state of adjustment.

14. The apparatus of claim 13, wherein the second frame is pivotable about the pivot bearing relative to the first frame over a range of motion constrained at least in part by the key-lock pairing.

15. The apparatus of claim 14, wherein the range of motion of the second frame includes a raised position and a lowered position, a key member of the key-lock pairing being positioned relatively rearward in the raised position than in the lowered position.

16. The apparatus of claim 15, wherein the spring arrangement is relatively more compressed in the lowered position than in the raised position.

17. The apparatus of claim 15, wherein in the raised position the key member is seated against the locking terminus surface of the key-lock pairing.

18. The apparatus of claim 14, wherein in a lowered position of the second frame a key member is rotatable relative to other components of the key-lock pairing over a range of motion defined at least in part by an aperture surface of the key-lock pairing.

19. The apparatus of claim 13, the first frame is operatively coupled with a three-point hitch of a vehicle.

20. The apparatus of claim 13, wherein the second frame is operatively coupled with a towable tool.

* * * * *